United States Patent
Kim

(10) Patent No.: US 7,232,624 B2
(45) Date of Patent: Jun. 19, 2007

(54) MEMBRANE AND ELECTRODE ASSEMBLY, PRODUCTION METHOD OF THE SAME AND FUEL CELL EMPLOYING THE SAME

(75) Inventor: Ji-rae Kim, Seoul (KR)

(73) Assignee: Samsung SDI Co., Ltd., Suwon, Kyungki-do (KR)

( * ) Notice: Subject to any disclaimer, the term of this patent is extended or adjusted under 35 U.S.C. 154(b) by 224 days.

(21) Appl. No.: 10/270,586

(22) Filed: Oct. 16, 2002

(65) Prior Publication Data
US 2003/0175578 A1    Sep. 18, 2003

(30) Foreign Application Priority Data
Mar. 13, 2002    (KR) ............... 2002-13482

(51) Int. Cl.
*H01M 4/00*    (2006.01)
(52) U.S. Cl. ............... 429/42; 429/40; 429/44
(58) Field of Classification Search .......... 429/40, 429/42, 44
See application file for complete search history.

(56) References Cited

U.S. PATENT DOCUMENTS

| | | |
|---|---|---|
| 4,185,131 A | 1/1980 | Goller et al. |
| 5,415,888 A | 5/1995 | Banerjee et al. |
| 5,869,416 A | 2/1999 | Mussell |
| 5,882,810 A | 3/1999 | Mussell et al. |
| 6,005,764 A * | 12/1999 | Anderson et al. ........... 361/500 |
| 6,277,447 B1 | 8/2001 | Chun et al. |
| 6,331,224 B1 | 12/2001 | Seko et al. |
| 6,696,382 B1 * | 2/2004 | Zelenay et al. ............. 502/168 |
| 2001/0028975 A1 * | 10/2001 | Narayanan et al. ........... 429/42 |
| 2002/0034674 A1 | 3/2002 | Starz et al. |
| 2002/0051903 A1 * | 5/2002 | Masuko et al. ............... 429/44 |
| 2003/0078157 A1 | 4/2003 | Matsuoka et al. |
| 2003/0207167 A1 * | 11/2003 | Prakash et al. ............... 429/42 |

FOREIGN PATENT DOCUMENTS

| | | | |
|---|---|---|---|
| JP | 5-170457 | * | 7/1993 |
| KR | 2002-0010535 A | | 2/2002 |
| WO | WO 02/075834 A1 | | 9/2002 |

OTHER PUBLICATIONS

European Patent Office Search Report.

* cited by examiner

*Primary Examiner*—Dah-Wei Yuan
(74) *Attorney, Agent, or Firm*—Buchanan Ingersoll & Rooney PC

(57) ABSTRACT

Provided is a method of producing a membrane and electrode assembly (MEA) comprising: mixing a metal catalyst with pure water, perfluorinated polymer ionomer and a polar organic solvent to prepare a composition for forming a catalyst layer; coating a diffusion layer formed on an electrode support with the catalyst layer forming composition, drying to forming a catalyst layer, thereby preparing a cathode and an anode, respectively; and interposing an electrolyte membrane between the anode and the cathode. The electrode catalyst for a fuel cell is inactivated to prevent spontaneous oxidation, thereby stabilizing the catalyst.

9 Claims, 2 Drawing Sheets

MEMBRANE AND ELECTRODE ASSEMBLY, PRODUCTION METHOD OF THE SAME AND FUEL CELL EMPLOYING THE SAME

Priority is claimed to Patent Application Number 2002-13482 filed in Republic of Korea on Mar. 13, 2002, herein incorporated by reference.

BACKGROUND OF THE INVENTION

1. Field of the Invention

The present invention relates to a membrane and electrode assembly (MEA), and more particularly, to an MEA which can produce a stable catalyst layer by maintaining a metal catalyst at an inactivated state using deionized water in forming the catalyst layer, a production method of the same and a fuel cell employing the same.

2. Description of the Related Art

Recently, as portable electronic devices and cordless communication equipments have been rapidly developed, much attention is being paid to development of fuel cells as portable power sources, fuel cells for pollution-free automobiles and power-generation systems as clean energy sources.

A fuel cell is a new power generation system for directly converting the chemical energy of fuel gas, e.g., hydrogen or methanol, and an oxidizer, e.g., oxygen or air, into electrical energy. There are several different fuel cells: molten carbonate fuel cells operating at higher temperatures of approximately 500 to approximately 700° C.; phosphoric acid fuel cells operating at approximately 200° C.; alkaline electrolyte fuel cells and polymer electrolyte fuel cells operating at below 100° C. or at room temperature.

The polymer electrolyte fuel cell is subdivided into a proton exchange membrane fuel cells (PEMFC) using hydrogen gas and a direct methanol fuel cell (DMFC) using liquid methanol according to anode fuel. The polymer electrolyte fuel cell, which is a source of future clean energy that can replace fossil energy, has high power density and high energy conversion efficiency. Also, the polymer electrolyte fuel cell can operate at room temperature and can be made miniaturized. Thus, the polymer electrolyte fuel cell has very wide applications including zero-emission vehicles, home power generation systems, and power source for mobile communications equipment, medical appliances and military equipment.

In general, a proton exchange membrane fuel cell using hydrogen is advantageous in that it has high power density, but cautious handling of hydrogen gas is needed and there is demand for an additional facility, such as a fuel reforming apparatus for reforming methane, methanol or natural gas to produce hydrogen fuel.

On the other hand, although having lower power density than gaseous fuel cells, a direct methanol fuel cell is considered to be suitable as a small and general-purpose portable power source from the viewpoints of manageability, low operation temperatures and no necessity of additional fuel reforming apparatus.

A basic unit of a direct methanol fuel cell (DMFC), MEA, is constructed of electrodes, that is, an anode and a cathode, disposed at opposite sides of an electrolyte, for oxidation and reduction. Each of the anode and cathode includes a support plate for maintaining the shape and strength of a cell, a diffusion layer for supplying fuel into the cell and a catalyst layer for reacting the fuel to be decomposed into ions.

The DMFC operates based on the following principle.

First, a methanol solution as fuel is supplied to the anode. The fuel absorbed into carbon paper used as the support plate is evenly diffused throughout the surface of the diffusion layer through pores present in the diffusion layer and is induced into the catalyst layer. The methanol solution induced into the catalyst layer reacts in the presence of a catalyst Pt—Ru to then be decomposed according to the electrochemical reactions below:

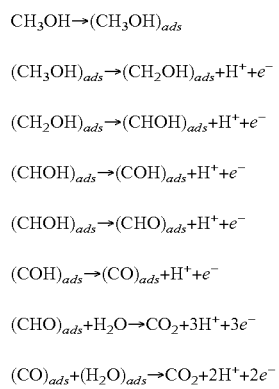

Protons produced by sequential decomposition steps by the action of the catalyst at the anode are transferred to the cathode across an electrolyte layer. Electrons produced simultaneously with the protons are also transferred to the cathode via the diffusion layer, a current collector and an external circuit. Carbon present in methanol reacts with deionized water to then be exhausted in the form of $CO_2$ gas.

In the cathode, oxygen present in the air is supplied through the support plate and is evenly diffused into the MEA via the gas diffusion layer. The oxygen transferred to the catalyst layer reacts with a Pt catalyst to produce oxygen ions and simultaneously reacts with the protons and electrons transferred from the anode to produce water.

In the anode of a DMFC, methanol oxidation occurs to produce protons and electrons. The produced protons and electrons are transferred to the cathode. In the cathode, the protons react with oxygen, that is, oxidation occurs. An electromotive force based on the oxidation reaction of the protons is an energy source of a fuel cell. The following reaction equations represent reactions occurring in the anode and cathode and an overall reaction occurring in the single cell.

[Anode]

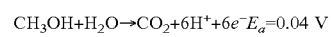

[Cathode]

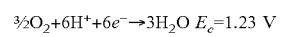

[Single Cell]

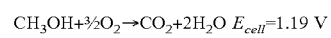

The overall performance of a fuel cell is greatly influenced by the performance of anode materials because the methanol decomposition in the anode determines the rate of the overall reaction. Thus, in order to realize commercialization of DMFCs, development of superb catalysts for methanol oxidation is quite important.

Known patents including U.S. Pat. Nos. 5,415,888, 4,185,131, 5,869,416 and 5,882,810 describe the use of alcohol or organic solvent in the manufacture of a catalyst layer and a diffusion layer without separate techniques or steps for preventing oxidation of a catalyst.

SUMMARY OF THE INVENTION

It is a first object of the present invention to provide a membrane electrode assembly (MEA) which can form a stable catalyst layer by maintaining a metal catalyst at an inactivated state, and a production method of the same.

It is a second object of the present invention to provide a fuel cell with improved performance by including the MEA.

To accomplish the first object of the present invention, there is provided a method of producing a membrane and electrode assembly (MEA) comprising:

(a) mixing a metal catalyst with pure water, perfluorinated polymer ionomer and a polar organic solvent to prepare a composition for forming a catalyst layer;

(b) coating a diffusion layer formed on an electrode support with the catalyst layer forming composition, drying to forming a catalyst layer, thereby preparing a cathode and an anode, respectively; and (c) interposing an electrolyte membrane between the anode and the cathode.

To accomplish the second object of the present invention, there is provided a fuel cell comprising the MEA.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
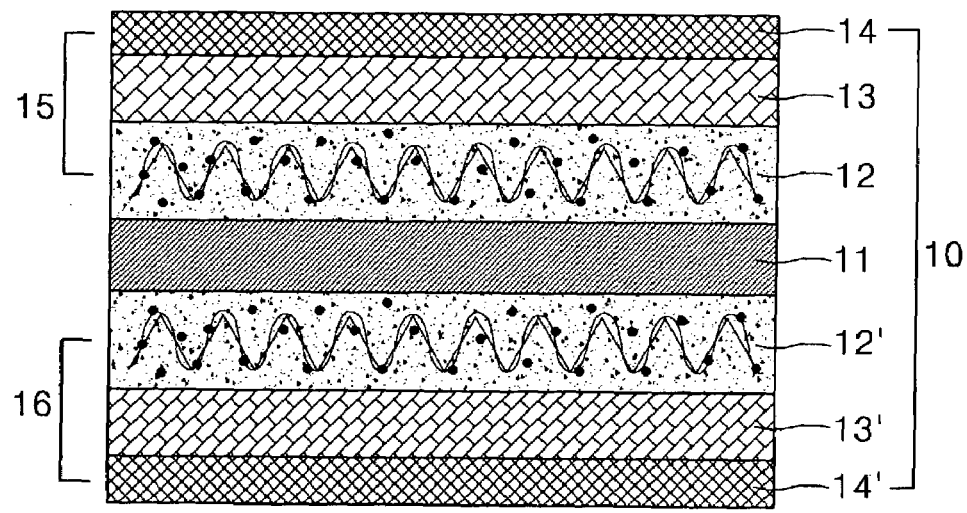
FIG. 1 is a cross-sectional view of a membrane electrode assembly (MEA) according to the present invention.

In order to enhance the performance of an electrode catalyst forming an MEA, it is necessary to form the catalyst using nanosized metal particles. However, if the catalyst metal particles are nanosized, they become unstable so that oxidation may occur when they are in contact with air or a solvent. To address this problem, the present invention features that a stable catalyst layer for an MEA is formed by maintaining the metal catalyst at an inactivated state by adding pure water during the manufacture of the catalyst layer. "Pure water" as used herein means water from which impurities are substantially removed, including distilled water or deionized water, and functions to maintain the metal catalyst at an inactivated state. The dispersibility and oxidation preventing performance of the metal catalyst vary depending on the content of the pure water added. Thus, it is necessary to optimize the content of the pure water.

A composition for forming the catalyst layer of the present invention includes a metal catalyst, pure water, perfluorinated polymer ionomer and a polar organic solvent. The composition is prepared by mixing the metal catalyst with the pure water, perfluorinated polymer ionomer and polar organic solvent. As described above, in preparing the composition, the metal catalyst is first mixed with the pure water, following by adding the other components to the mixture, which is preferred in view of a stabilizing effect of the metal catalyst. In mixing the components, a mechanical mixer and a homogenizer are preferably used to obtain uniformity in the composition.

The amount of the pure water is in the range of 100 to 200 parts by weight, specifically 140 to 160 parts by weight based on 100 parts by weight of the metal catalyst. If the amount is less than 100 parts by weight, oxidation preventing performance of the metal catalyst is trivial. If the amount is greater than 200 parts by weight, the dispersibility of the composition for forming the catalyst layer is poor.

Examples of the metal catalyst include, but not limited to, two or more binary, ternary or quaternary metal catalysts selected from the group consisting of Pt, Ru, Rh, Ni, Os, Mn, Ti, Zr, W, Fe, Mo, Ir and Sn, more preferably Pt and Ru based binary, ternary or quaternary metal catalysts.

The perfluorinated polymer ionomer provides a passage for allowing ions generated by the reaction between fuel (e.g., methanol) and a catalyst to move toward an electrolyte membrane. Examples of the perfluorinated polymer ionomer include Nafion ionomer (manufactured by du Pont), and the amount thereof is preferably in the range of 10 to 15 parts by weight based on 100 parts by weight of the metal catalyst. If the amount is less than 10 parts by weight, the shortage results in improper formation of an ion transfer path in the catalyst layer, disabling the ions generated by the catalyst reaction to smoothly migrate. If the amount is greater than 15 parts by weight, the ionomer may block the catalyst layer, the excess gives rise to difficulty in the reaction between the catalyst and fuel.

The organic polar solvent is an alcohol-series solvent, and at least one selected from the group consisting of isopropyl alcohol, ethanol and methanol is used as the organic polar solvent. The content of the organic polar solvent is preferably in the range of 500 to 2500 parts by weight based on 100 parts by weight of the metal catalyst. If the content of the organic polar solvent is less than 500 parts, the viscosity of a catalyst forming composition is excessively increased, resulting in clogging of a nozzle when spray coating the composition. If the content is greater than 2500 parts, the excess gives rise to too low a viscosity of the composition, thereby making it difficulty to coat the composition onto a diffusion layer.

A method for producing the MEA according to the present invention will now be described in detail.

First, a diffusion layer forming composition is applied to a cathode support and an anode support and dried, followed by sintering, thereby forming a cathode diffusion layer and an anode diffusion layer, respectively. As the electrode support, carbon paper having a porosity of approximately 70 to 80% is used for an anode and a hydrophobic carbon paper impregnated with polytetrafluoroethylene (PTFE) is used for a cathode.

The diffusion layer forming composition is prepared by mixing a fluorine resin, e.g., PTFE, carbon black and an organic solvent. As the organic solvent, an alcohol-series solvent such as isopropyl alcohol is used. The contents of various ingredients of the diffusion layer forming composition are used in conventional levels. Specifically, carbon black is used in an amount of 100 to 500 parts by weight and the organic solvent is used in an amount of 2500 to 5000 parts by weight, based on 100 parts by weight of the fluorine resin.

Coating methods of the diffusion layer forming composition are not particularly restricted, and examples thereof include spray coating. The coating step is preferably dried at a temperature 80 to 140° C., more preferably approximately 120° C.

The sintering step is preferably carried out under a stream of nitrogen gas at a temperature 300 to 370° C., more preferably 350° C. The thickness of the diffusion layer formed is preferably 20 to 30 μm.

The formed diffusion layer is coated with the catalyst forming composition of the present invention to form a catalyst layer for forming a cathode and an anode, respectively. Coating of the catalyst forming composition is preferably carried out by spray method under inert gas. Here, the inert gas is at least one selected from the group consisting of nitrogen ($N_2$), helium (He), neon (Ne) and argon (Ar), and the pressure thereof is in the range of 0.5 to 3 atm. If the pressure of the inert gas is less than 0.5 atm, it is difficult to diffuse the catalyst forming composition. If the pressure of the inert gas is greater than 3 atm, the amount of the composition inert gas splashed is greater than the amount thereof coated, that is, the utilization efficiency of the composition is, lowered.

After coating the catalyst forming composition, the resultant coating may be dried. Here, the drying temperature is preferably in the range of 80 to 120° C., more preferably approximately 110° C. A drying time may vary according to the drying temperature. For example, at a drying temperature of approximately 110° C., the drying time is preferably 1 to 3 hours.

The thickness of the formed catalyst layer is in the range of approximately 5 to 25 μm, preferably approximately 10 μm.

Thereafter, an electrolyte membrane is interposed between the anode and the cathode and then hot pressed. The hot-pressing condition is not particularly restricted, but hot-pressing is preferably carried out in a hot press at a temperature of 80 to 130° C., preferably approximately 125° C., under the pressure of 0.1 to 10 ton, preferably 0.5 to 5 ton. Particularly, the hot-pressing is preferably carried out step by step while varying pressure and temperature. In other words, during a first step, hot pressing is carried out at 125° C. with 0.5 ton for 5 minutes. During a second step, hot pressing is carried out at 125° C. with 5 ton for 5 minutes. During a third step, hot pressing is carried out at room temperature with 0.5 ton. Here, in order to adjust the temperature of the resultant product at room temperature, cooling is carried out using cold water. The hot-pressed product is preferably kept in pure water, specifically deionized water, for the purpose of feeding moisture into the electrolyte in a state in which the product is blocked from air.

As a result, the MEA having the stack structure shown in FIG. 1 is completed.

Referring to FIG. 1, the MEA 10 is constructed such that an anode 15 is fixed on one plane of an electrolyte membrane 11 and a cathode 16 is fixed on the other plane thereof. The anode 15 is fabricated by sequentially stacking an anode catalyst layer 12, an anode diffusion layer 13 and an anode support plate 14 on the electrolyte membrane 11. The cathode 16 is fabricated by sequentially stacking a cathode catalyst layer 12', a cathode diffusion layer 13' and a cathode support plate 14' on the electrolyte membrane 11.

Prior to use, the electrolyte membrane 11 is pre-treated to then be converted into a electrolyte structure having a —$SO_3H$ group.

The fuel cell of the present invention, in particular, the DMFC, can be produced by employing a plurality of MEAs shown in FIG. 1.

The invention is further illustrated by the following examples. All references made to these examples are for the purposes of illustration. It should be understood that the invention is not limited to the specific details of the examples.

EXAMPLE 1

Preparation of Anode

An anode support was prepared by cutting hydrophilic carbon paper into a size of 12×12 (cm) and then fixed on a spray frame.

Separately, a diffusion layer forming composition was prepared as follows.

First, 600 mg of Vulcan XC-72R carbon black (Cabot Corporation) was added to 50 g of isopropyl alcohol and mixed using a homogenizer for 5 minutes. To the resultant mixture was added 1000 mg of a PTFE emulsion (60 wt %), and mixed using a mechanical mixer for 1 minute, thereby allowing the PTFE emulsion to be diffused well.

The diffusion layer forming composition was applied onto the carbon paper and dried at a vacuum oven maintained at a temperature of 120° C. for 2 hours to remove solvent components. Subsequently, the resultant product was sintered at a furnace under a stream of nitrogen at 350° C. for 20 minutes, yielding a diffusion layer. The finally obtained diffusion layer exhibited a hydrophobic property and the content of carbon black contained in the diffusion layer was approximately 1.5 mg/cm$^2$.

Next, a catalyst layer forming composition was prepared as follows.

1100 mg of a Pt catalyst and 1760 mg of deionized water were mixed and stirred using a mechanical mixer for 1 minute. Milli-Q (produced by Millipore) having quality properties including 18.2 MΩ cm in resistivity at 25° C., 0.02 EU/ml in pyrogen content, 5 to 10 ppb in total organic carbon (TOC) content, and ≦1 cfu/ml in microbial content, and <1/ml in number of particles having a diameter of 0.22 μm, was used as the deionized water. To a mixture of the Pt catalyst and deionized water was added 2750 mg of 5 wt % Nafion™ (produced by du Pont) ionomer, and stirred by a magnetic homogenizer for 30 seconds, followed by adding 27.5 g of isopropyl alcohol and further stirring by a homogenizer for 3 minutes, thereby forming the catalyst layer forming composition. In the catalyst layer forming composition, the mixture ratio of Pt catalyst to deionized water to Nafion ionomer solid to isopropyl alcohol was 1:1.5:0.125:25 by weight.

The diffusion layer was coated with the catalyst layer forming composition using spray method under nitrogen and dried at a vacuum oven maintained at a temperature of 80° C. for 1 hour to form a catalyst layer, thereby completing an anode.

EXAMPLE 2

Preparation of Cathode

A cathode support was prepared by impregnating fluorinated ethylene propylene (PEP) copolymer into carbon paper in an amount of 20% by weight based on the weight of the carbon paper, drying the resultant structure at a vacuum oven maintained at a temperature of 110° C. for 2 hours to remove a solvent, sintering at a furnace with a stream of nitrogen at 350° C. for 20 minutes to obtain hydrophobic carbon paper and cutting the same into a size of 12×12 (cm). The obtained hydrophobic carbon paper was fixed on a spray frame.

Then, a diffusion layer forming composition was prepared as follows.

First, 600 mg of Vulcan XC-72R carbon black was mixed with 50 g of isopropyl alcohol and further mixed using a homogenizer for 5 minutes. To the resultant mixture was added 1000 mg of a PTFE emulsion (60 wt %), and mixed using a mechanical mixer for 1 minute, thereby allowing the PTFE emulsion to be diffused well.

The thus-prepared diffusion layer forming composition was applied onto the carbon paper fixed on the spray frame to a thickness of 20 to 30 µm and dried at a vacuum oven maintained at a temperature of 120° C. for 2 hours to remove solvent components. Subsequently, the resultant product was sintered at a furnace under a stream of nitrogen at 350° C. for 20 minutes, yielding a diffusion layer for a cathode. The finally obtained diffusion layer exhibited a hydrophobic property and the content of carbon black contained in the diffusion layer was approximately 1.5 mg/cm$^2$.

Next, a catalyst layer forming composition was prepared as follows.

First, 1100 mg of a Pt catalyst and 1760 mg of deionized water were mixed and stirred using a mechanical mixer for 1 minute. Milli-Q (produced by Millipore) having quality properties including 18.2 MΩ cm in resistivity at 25° C., 0.02 EU/ml in pyrogen content, 5 to 10 ppb in total organic carbon (TOC) content, and ≦1 cfu/ml in microbial content, and <1/ml in number of particles having a diameter of 0.22 µm, was used as the deionized water. To a mixture of the Pt catalyst and deionized water was added 2750 mg of 5 wt % Nafion™ (produced by du Pont) ionomer, and stirred by a magnetic homogenizer for 30 seconds, followed by adding 27.5 g of isopropyl alcohol and further stirring by a homogenizer for 3 minutes, thereby forming the catalyst layer forming composition. In the catalyst layer forming composition, the mixture ratio of Pt catalyst to deionized water to Nafion ionomer solid to isopropyl alcohol was 1:1.6:0.125: 25 by weight.

The diffusion layer was coated with the catalyst layer forming composition using spray method under nitrogen and dried at a vacuum oven maintained at a temperature of 80° C. for 1 hour to form a catalyst layer, thereby completing a cathode.

EXAMPLE 3

Preparation of MEA

The anode and cathode prepared in Examples 1 and 2 were kept at a dry keeper to dehumidify a catalyst layer. As an electrolyte membrane, a Nafion 115 membrane (produced by du Pont) was used. Prior to use, the electrolyte membrane is pre-treated to then be converted into an electrolyte structure having a —SO$_3$H group.

The electrolyte membrane and the electrodes were sealed using a hot press. In detail, the cathode was placed on an assembly plate and fixed using a gasket. Then, the size of the electrolyte membrane was adjusted to conform to that of the gasket. The electrolyte membrane was placed on the anode and fixed using a gasket. The assembly plate was mounted on the resultant structure.

For sealing the electrolyte membrane and the electrodes, the resultant assembly was placed on a plate maintained at a temperature of 125° C., followed by subjecting to hot pressing with a pressure of 0.5 ton for 5 minutes. Then, hot pressing was further performed with an increased pressure of 5 ton for 3 minutes. Finally, the pressure was lowered to 0.5 ton and the plate was cooled using cold water, thereby completing an MEA. The thus prepared MEA was stored in deionized water.

COMPARATIVE EXAMPLE

An MEA was produced in the same manner as in Examples 1-3 except that deionized water was not added in preparing anode and cathode catalyst layers.

Figure 2:
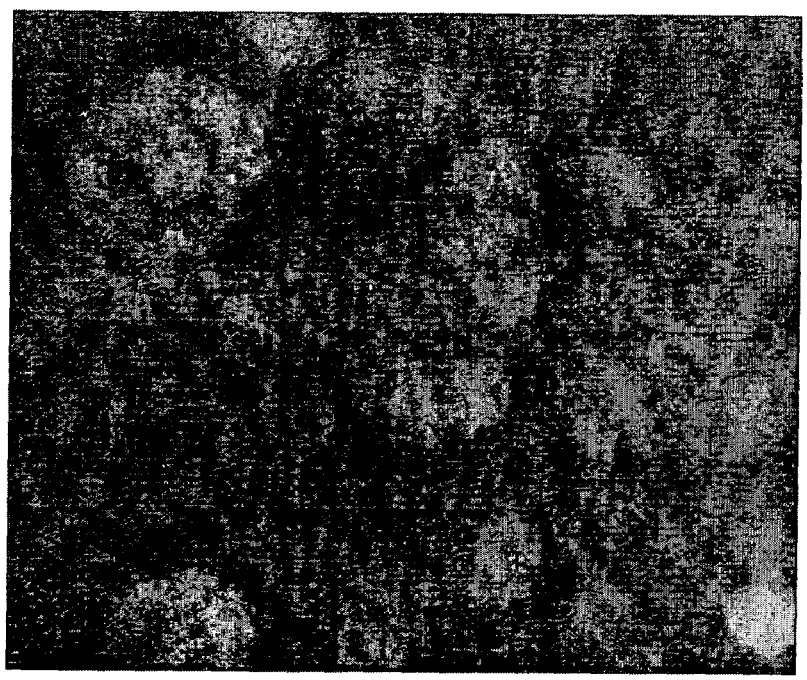
FIG. 2 is a scanning electron micrograph (SEM) of an electrode catalyst layer prepared in Comparative Example.

In the MEAs produced in Example 3 and Comparative Example, the surface of the anode catalyst layer was analyzed by SEM, and the result thereof is shown in FIG. 2.

Referring to FIG. 2, Pt present in the catalyst layer of Comparative Example was oxidized to form a Pt oxide, and white spots were observed.

Figure 3:
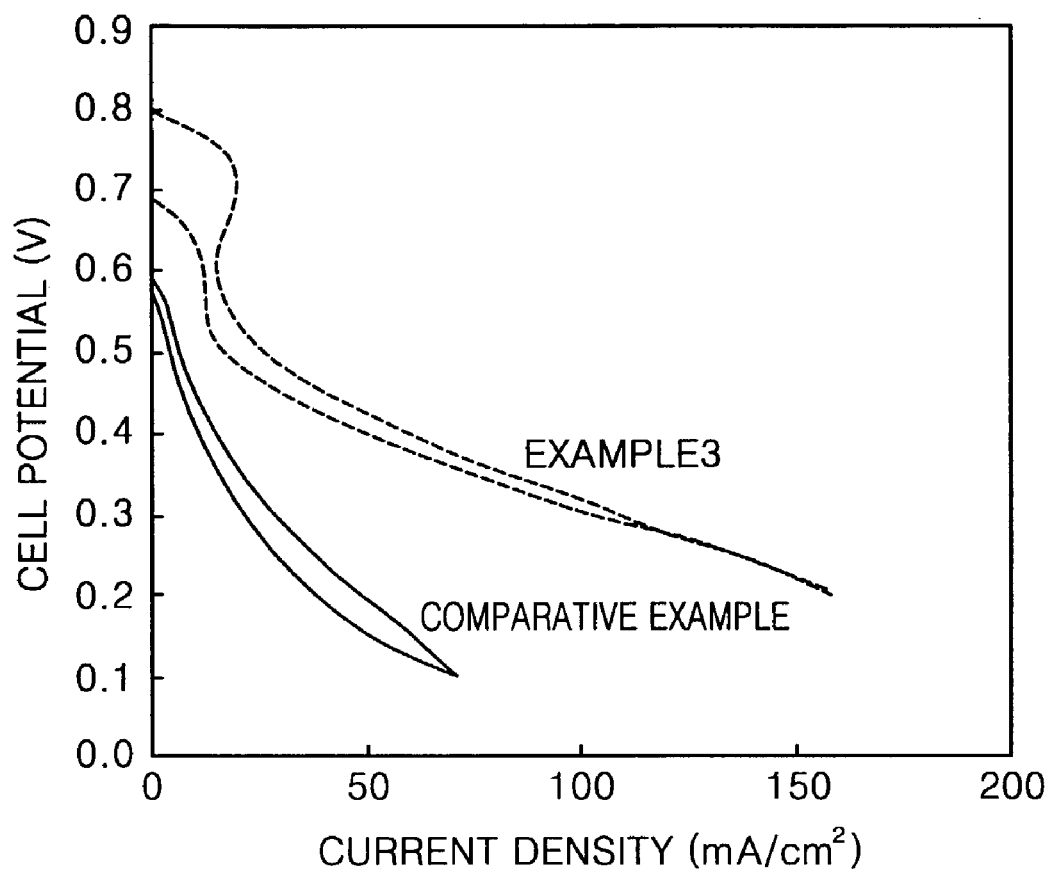
FIG. 3 is a graph showing a change in current density depending on cell voltages in a fuel cell prepared in Example 3 of the present invention.

A direct methanol fuel cell (DMFC) was produced using the MEA (size: approximately 9 cm$^2$) prepared in Example 3. The efficiency of the produced DMFC was investigated. The efficiency of a fuel cell is determined by observing a change in cell potential depending on current density. A higher current density of a DMFC represents a higher efficiency. The observation result is shown in FIG. 3. The cell potentials were measured at room temperature and room pressure using methanol solutions having concentrations of 2 M and 5 M.

Referring to FIG. 3, the DMFC using the MEA prepared in Example 3 provides a current density of 110 mA/cm$^2$, representing the cell performance of 33 mW/cm$^2$, whereas the conventional fuel cell using the MEA prepared in Comparative Example provides a current density of 30 mA/cm$^2$ at 0.3 V. Thus, the cell performance shown in FIG. 3 represents a significant improvement of approximately 30% over the performance of the conventional fuel cell.

According to the present invention, an electrode catalyst for a fuel cell is inactivated to prevent spontaneous oxidation, thereby stabilizing the catalyst. Also, when coating a catalyst forming composition, spray coating is employed to produce a three-dimensional microstructure consisting of a catalyst, an ionomer and a conductor, thereby making the surface of the catalyst layer even. Further, unlike in the conventional fuel cell fabrication technology, there is no need for a facility for performing the fabrication process under a stream of inert gas, and the process is simplified.

What is claimed is:

1. A method of producing a membrane and electrode assembly (MEA) comprising:
   (a) mixing a metal catalyst with pure water, perfluorinated polymer ionomer and a polar organic solvent to prepare a catalyst layer forming composition;
   (b) coating the catalyst layer forming composition onto a diffusion layer formed on an electrode support, drying to form a catalyst layer, thereby preparing a cathode and an anode, respectively;
   (c) interposing an electrolyte membrane between the anode and the cathode; and
   (d) sealing the electrolyte membrane between the anode and the cathode,
   wherein the catalyst layer forming composition in step (a) is prepared by mixing the metal catalyst with pure water and then mixing the polymer ionomer and the polar organic solvent thereto,
   wherein the content of the pure water is in the range of 140 to 160 parts by weight based on 100 parts by weight of the metal catalyst, and
   wherein the diffusion layer is formed by:
   mixing a fluorine resin and an organic solvent to form a diffusion layer forming composition;

applying the diffusion layer forming composition to a cathode support and an anode support;

drying the diffusion layer forming composition; and sintering the diffusion layer forming composition to form a cathode diffusion layer and an anode diffusion layer, respectively.

2. The method according to claim 1, wherein the coating of step (b) is spray coating using a nozzle under a stream of inert gas.

3. The method according to claim 2, wherein the inert gas is at least one selected from the group consisting of $N_2$, He, Ne and Ar.

4. The method according to claim 2, wherein the pressure of the inert gas is in the range of 0.5 to 3 atm.

5. The method according to claim 2, wherein the metal catalyst is two or more binary, ternary or quaternary metal catalysts selected from the group consisting of Pt, Ru, Rh, Ni, Os, Mn, Ti, Zr, W, Fe, Mo, Ir and Sn.

6. The method according to claim 1, wherein the perfluorinated polymer ionomer is Nafion ionomer, and the amount thereof is in the range of 10 to 15 parts by weight based on 100 parts by weight of the metal catalyst.

7. The method according to claim 1, wherein the organic polar solvent is at least one selected from the group consisting of isopropyl alcohol, ethanol and methanol, and the content thereof is in the range of 500 to 2500 parts by weight based on the total weight of the metal catalyst.

8. The method according to claim 1, wherein the drying in step (b) is carried out at 80 to 120° C.

9. The method according to claim 1, wherein the thickness of the catalyst layer is 5 to 25 μm.

* * * * *